United States Patent [19]
Flaum

[11] Patent Number: 4,515,052
[45] Date of Patent: May 7, 1985

[54] AUTOMATIC SLITTER

[75] Inventor: Stephen S. Flaum, Brooklyn, N.Y.

[73] Assignee: S&S Corrugated Paper Machinery Co., Inc., Brooklyn, N.Y.

[21] Appl. No.: 423,234

[22] Filed: Sep. 24, 1982

[51] Int. Cl.³ .......................... B26D 3/08; B26D 11/00
[52] U.S. Cl. ........................................ 83/479; 83/499; 83/504; 83/508.3; 493/60; 493/64; 493/365; 493/367; 493/475; 493/478
[58] Field of Search .................. 83/479, 498, 499, 504, 83/508.3; 493/60, 64, 65, 354, 365, 367, 370, 471, 475, 478

[56] References Cited

U.S. PATENT DOCUMENTS

| | | | |
|---|---|---|---|
| 1,959,424 | 5/1934 | Hawkins | 493/475 |
| 3,408,886 | 11/1968 | David | 83/408 |
| 3,587,374 | 6/1971 | Stewart | 83/479 |
| 3,646,418 | 2/1972 | Sterns et al. | 83/479 |
| 3,882,765 | 5/1975 | Tokuno | 493/365 |
| 4,010,677 | 3/1977 | Harikawa | 83/499 |
| 4,033,217 | 7/1977 | Flaum et al. | 493/475 |
| 4,142,455 | 3/1979 | Coburn | 83/479 |
| 4,214,495 | 7/1980 | Coburn | 83/499 |
| 4,237,761 | 12/1980 | Coburn | 83/665 |
| 4,254,677 | 3/1981 | Evans | 83/499 |

Primary Examiner—Frank T. Yost
Assistant Examiner—Hien H. Phan
Attorney, Agent, or Firm—Ostrolenk, Faber, Gerb & Soffen

[57] ABSTRACT

A duplex slitter scorer mounted on a single pivoted sub-carrier is provided with a single power adjusting apparatus disposed entirely below the paper feed path. The adjusting apparatus includes a single rotatable lead screw to position a common carrier mounting first and second relatively movable adjusting arms that are selectively engageable in sequence with the slitting and creasing heads. The lead screw axis is fixed transversely and both adjusting arms are retractable to permit indexing of the pivoted sub-carrier. To compensate for paper weave, the sub-frame is moved along its pivot axis. The lead screw is fixed against longitudinal movement but is partially controlled by a signal indicative of sub-carrier position along its pivot axis so that the instantaneous position of the adjusting apparatus common carrier is related to the instantaneous position of the sub-frame along its pivot axis.

17 Claims, 2 Drawing Figures

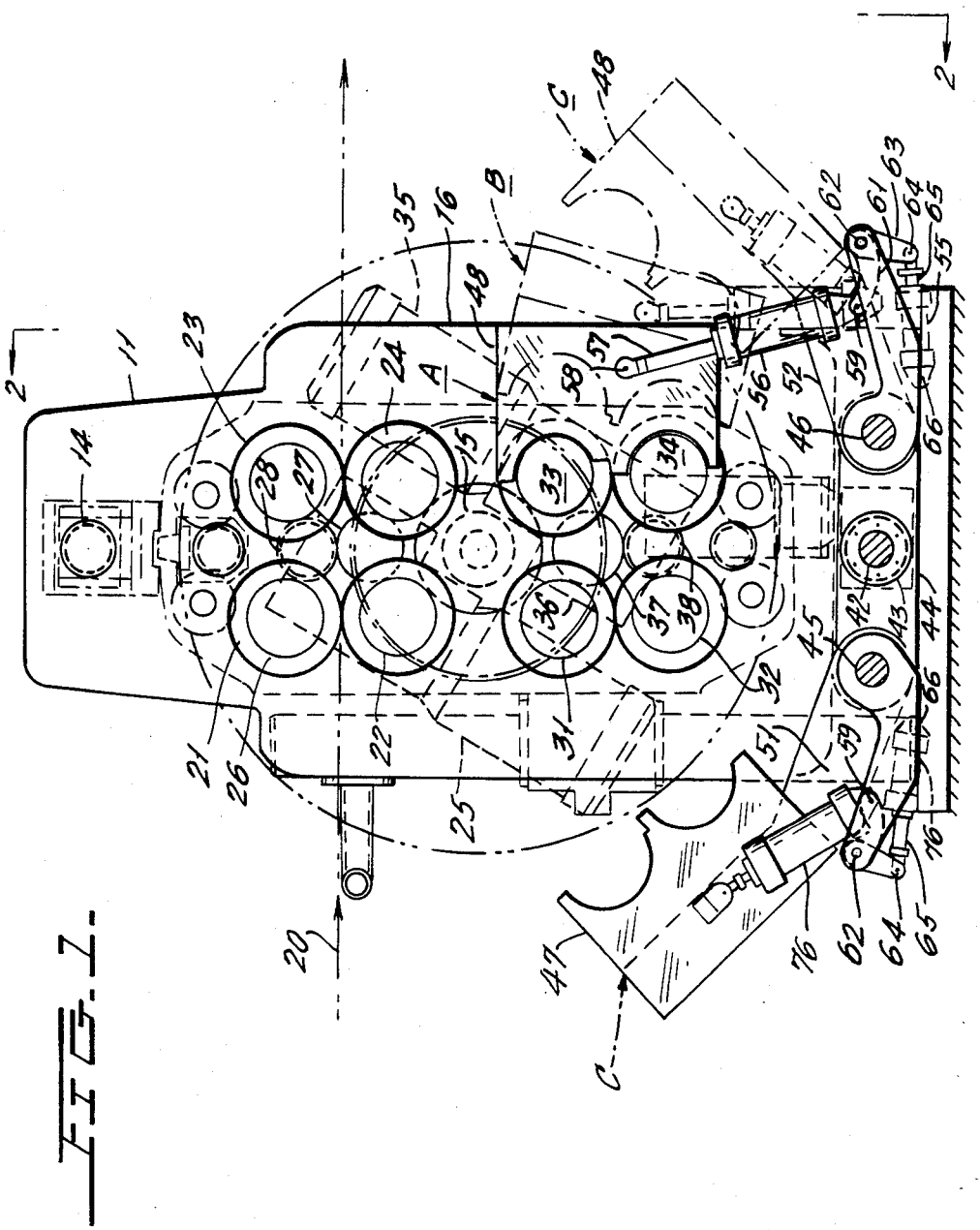

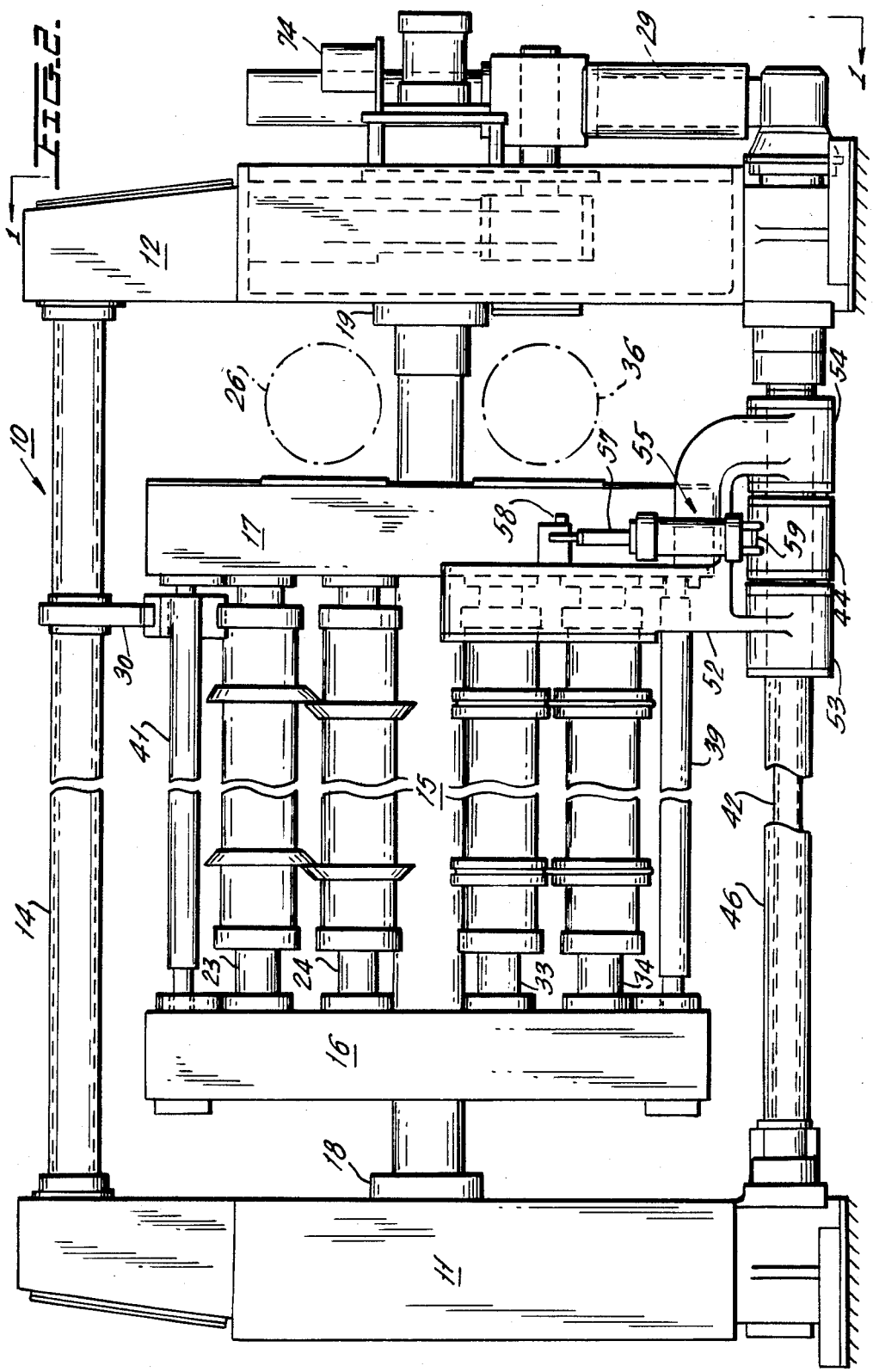

AUTOMATIC SLITTER

BACKGROUND OF THE INVENTION

This invention relates generally to apparatus for producing sheets of corrugated board and the like and more particularly relates to a multiple station slitter scorer in which the heads are power adjusted.

Corrugated board is produced as a relatively wide web which is cut longitudinally by a slitter scorer into a plurality of narrow webs that are subsequently cut transversely into sheets. The slitter scorer also indents or creases the board, when necessary, to facilitate subsequent folding operations.

To prevent excessive downtime of the very expensive corrugator and related machinery when adjusting the slitter scorer for a new order, normally the latter is constructed to have a plurality of stations one of which is adjusted for the next run while another station is operating on the wide web. For the most part, prior art slitter scorers were constructed so that the stations were movable to a single paper line along which the web traveled through the slitter. At the same time the station having the cutting and creasing heads to be adjusted for the next run was moved to an advantageous position for head adjustment. In a typical plant, slitter scorers have to reset or adjusted 30 times for an 8 hour shift. Most prior art slitter scorers required that the head pairs, typically a total of 13 pairs for each station, be adjusted individually and manually with the operator being required to perform these adjustments in relatively tight quarters close to rotating slitter and creaser heads so that adjustment was an unpleasant and time-consuming operation. Because of this the prior art has attempted to provide power driven adjusting means.

A power driven adjusting means for slitter heads is disclosed in U.S. Pat. No. 3,646,418, issued Feb. 28, 1972, to R. B. Sterns et al. for "Positioning of Multiple Elements". In the device of the Sterns et al. patent an individual adjusting mechanism is provided for each head pair with the multiplicity of head adjusting devices making the apparatus relatively expensive. Further, controls must be able to determine the motions of all head adjusting devices simultaneously. This requires either a separate sensor in each head adjusting device or at least separate controls for starting and stopping each head adjusting device. Utilizing separate controls on each head adjusting device requires all the devices to be driven by a common lead screw in order that a single sensor be used. With a single sensor arrangement of this type revolutions of the lead screw are counted between the time a given head adjusting device is engaged with the lead screw to the time when the device disengages from the lead screw. The power driven adjusting means of the aforesaid U.S. Pat. No. 3,646,418 required two cycles of operation to set-up a single station. First, the slitters or scorers were positioned and then the entire power driven adjusting means had to be moved bodily for engagement with and set-up of the remaining slitters or scorers.

The prior art, upon realizing the deficiencies of the foregoing approach including means for independently engaging and disengaging each head adjusting device with the lead screw and means for automatically controlling these engaging and disengaging devices, all of which adds considerably to the expense of the apparatus and the likelihood of failure, provided a single head adjusting device for each station constructed so that it selectively engages each head pair to sequentially move the head pairs to selected positions along the lengths of their drive shafts. While the single head adjusting device engages the heads in sequence, a degree of simultaneous adjustment is obtained in that while the device engages and moves one head this head may impart motion to an adjacent head moving the latter toward its position.

Examples of a single head adjusting device for sequentially engaging a plurality of head pairs are found in U.S. Pat. No. 4,033,217, issued July 5, 1977 to S. S. Flaum et al. for "Slitter Having Carrier for Selective Adjustment of a Plurality of Heads" and U.S. Pat. No. 4,214,495, issued July 29, 1980 to R. E. Coburn for "Slitter Scorer Apparatus". While the devices of the aforesaid U.S. Pat. Nos. 4,033,217 and 4,214,495 provide automatic adjusting means of reduced cost, they do so at the expense of excessive size, difficulty of manual adjustment and costs that should be further reduced. In addition, because the stations of these devices are necessarily large, it would be cumbersome and costly to move them. Instead, they are fixed in position one above the other; means are therefore required for shifting the paper line up and down so that it extends through the station being used to slit and score the web. This vertical movement of the paper line is normally done while the machine is running to avoid wasting time and disrupting process parameters, but control of the paper path is sometimes lost during this vertical movement, with the result that the machine jams, wasting paper and losing production time. That is, each of these constructions requires a separate adjusting means for each four shaft or bar slitter scorer station, with one adjusting means being disposed above the paper line and the other below the paper line. The adjusting means and their associated head pairs are not readily accessible for servicing and/or manual adjustments. The foregoing results in part because the stations are located one above the other and they are in fixed vertical positions.

Even when the prior art has sought to provide movable stations and utilize a single automatic adjusting means, the result has been that the automatic adjusting means is split so that there is a portion below the paper line as well as a portion above the paper line. This adds to costs of construction, and the split adjusting means makes manual adjusting difficult especially for the portion above the paper line. An example of the latter type of construction is found in U.S. Pat. No. 3,587,374, issued June 28, 1971 to W. A. Stewart et al. for "Presettable Slitter-Scorer Apparatus". This prior art construction has the slitters and scorers mounted on different rotatable carriers so that there must be considerable spacing between them.

SUMMARY OF THE INVENTION

In accordance with the instant invention, the foregoing shortcomings of the prior art are overcome by utilizing a two-station arrangement mounted to a single rotatable sub-frame, with each station having four bars and being movable between a lowered set-up location and a raised working location. With this construction, the same paper line is utilized for both stations and a single stationary adjusting means is utilized for both stations. The adjusting means includes a single carrier that is operated transversely by a single lead screw. First and second tool engaging yokes are movably mounted to opposite ends of the carrier and are selectively operable into and out of engagement with the cutting and creasing tools to move the latter to preselected positions along the axis of the lead screw. For each of the slitter scorer stations, one yoke is for positioning the scorer tools and the other yoke is for positioning the slitter tools. During set-up, movement of the yokes into and out of engagement with the tools is relatively short. However, when indexing of the station carrying frame is to take place, the yokes are moved to positions that are substantial distances from the axis of rotation for the station mounting sub-frame, thereby providing clearance for indexing of the sub-frame. Costs may be reduced by moving each yoke to only a single disengaged position which will permit indexing of the sub-frame.

Another feature of the instant invention concerns the fact that the single lead screw is mounted against both axial and transverse movement, yet set-up takes place while paper is being run through the apparatus and the slitter scorer stations are being adjusted automatically along the pivot axis for the sub-frame to compensate for paper weave. This is accomplished by generating a signal indicative of the transverse position of the sub-frame and feeding the signal to the electronics that controls positioning of the carrier so that at all times the position of the carrier reflects the axial position of the sub-frame.

Accordingly, the primary object of the instant invention is to provide a novel construction for a slitter scorer having power driven means for adjusting head positions.

Another object is to provide a slitter scorer of this type that utilizes space efficiently, is relatively inexpensive to construct and in which there is ready accessibility for servicing and making of manual adjustments.

Still another object is to provide a slitter scorer of this type in which there are two stations each having four shafts mounted on a common movable sub-frame, and a common head adjusting means disposed entirely below the paper path.

A further object is to provide a slitter scorer of this type in which the common adjusting means utilizes a single lead screw that is fixed relative to its longitudinal axis.

A still further object is to provide a slitter scorer of this type in which the sub-frame carrying the slitter scorer tools is automatically adjusted transverse to direction of paper movement to compensate for paper weave, and in which the single lead screw of the common head adjusting means is rotatable yet is fixed against both longitudinal and transverse movement.

BRIEF DESCRIPTION OF THE DRAWINGS

These objects as well as other objects of this invention shall become readily apparent after reading the following description of the accompanying drawings, in which:

FIG. 1 is an end view of slitter scorer means constructed in accordance with teachings of the instant invention, looking in the direction of arrows 1—1 of FIG. 2.

FIG. 2 is a side elevation of the slitter scorer looking upstream in the direction of arrows 2—2 of FIG. 1, with the cutting and creasing tools and other elements removed for the sake of clarity.

DESCRIPTION OF THE PREFERRED EMBODIMENT

Now referring to the Figures. Slitter scorer 10 includes parallel horizontally spaced and vertically extending main frame members 11, 12 joined at their upper ends by brace 14. Disposed between members 11, 12 are sub-frame members 16, 17 keyed to horizontal shaft 15 that is pivotally mounted in bearings 18, 19 supported by the respective frame members 11, 12. Extending between sub-frame members 16, 17 and mounted thereto are the elements constituting two slitter scorer stations, including four shafts 21, 22, 23, 24 for the first station and four shafts 31, 32, 33, 34 for the second station. In a manner well known to the art, a plurality of creaser head pairs are mounted along the length of shafts 21, 22 and another plurality of creaser heads are mounted along the length of shafts 33, 34. Similarly, a plurality of slitter head pairs are mounted along the length of shafts 23, 24 and another plurality of slitter head pairs are mounted along the length of shafts 31, 32.

Shafts 22–24 are rotated by energizing motor 25 that drives speed reducer 26 whose output drives main gear 27. The latter drives shafts 22, 24 by direct engagement with gears keyed to the shafts and acting indirectly through idler 28 drives gears keyed to shafts 21, 23. Similarly, shafts 31–34 of the other station are driven by motor 35 which acts through speed reducer 36 to drive the other main gear 37. The latter is in direct driving engagement with gears keyed to shafts 31 and 33 and acting through idler 38 drives gears keyed to shafts 32 and 34. FIG. 2 includes a partial illustration that the drive elements for shafts 21–24 and 31–34 are supported by sub-frame member 17, with speed reducers 26, 36 being disposed between main frame member 12 and sub-frame member 17, and being mounted to the latter.

In the position shown in FIG. 1, the slitter scorer station including shafts 21–24 is positioned in the upper or working location wherein it is disposed to receive a web of corrugated board or the like moving along a horizontal feed path 20, from left to right with respect to FIG. 1. Feed path 20 extends between the cooperating pairs of scorers on shafts 21, 22 and between the cooperating pairs of slitters on shafts 23, 24. At this time, the slitter scorer station, including shafts 31–34, is disposed at the lower or set-up location entirely below feed path 20. Drive means of a type well known to the art, including hydraulic cylinder 29 operatively connected to rotate shaft 15, is provided to pivot sub-frame 16, 17 in 180° steps between the position shown in FIG. 1 and another position where the slitter scorer station including shafts 21–24 is in the set-up location and the other slitter scorer station including shafts 31–34 is disposed at the working location where shafts 32, 34 are disposed above feed path 20 and shafts 31, 33 are disposed below feed path 20. Latch mechanism 30 secured to transverse frame member 14 is operatively engageable with horizontal members 41, 39 extending between sub-frame members 16, 17 at opposite ends thereof to latch sub-frame 16, 17 in the position to which it has been indexed.

Extending parallel to pivot shaft 15 and disposed below sub-frame 16, 17 is lead screw 42 that is rotatably supported in bearings mounted on main frame members 11, 12. Lead screw 42 is the drive element for a power driven adjusting means which moves the slitter scorer tools or heads at the set-up location to preselected positions along the lengths of their respective drive shafts. Lead screw 42 is in driving engagement with follower nut 43 mounted to carrier 44 that is supported and guided by shafts 45, 46 that extend parallel to screw 42, with shaft 45 being upstream of screw 42 and shaft 46 being downstream thereof. The power driven adjusting means also include two adjusting yokes 47, 48 having respective extensions 51, 52 which are pivotally mounted on the respective guide shafts 45, 46 and are slidable therealong. Since the constructions and operations for yokes 47, 48 are substantially the same, for the sake of brevity, without sacrificing clarity, only one of the yoke elements 47, 48 and its operation shall be described.

As seen in FIG. 2, the lower end of extension 52 (the end thereof remote from yoke 48) is bifurcated to form sections 53, 54 that are disposed adjacent to opposite sides of carrier 44. Guide shaft 46 extends through both sections 53, 54.

Yoke 48 is moved into and out of engagement with pairs of scorers at the set-up region by controlling the operation of double acting power cylinders 55, 56. Extendable arm 57 projects from the upper end of cylinder 55 and is connected to yoke 48 at pivot 58. The lower end of cylinder 55 is connected by pivot 59 to one end of crank arm 61 whose other end is keyed to fixed sub-shaft 62 that is pivotally mounted on an extension at the right of carrier 44 when the latter is viewed in FIG. 1. Also keyed to shaft 62 is one end of crank arm 63 whose other end is pivotally connected at 64 to the free end of arm 65 extending from the right end of power cylinder 56. The other end of cylinder 56 is mounted to fixed pivot 66 on carrier 44.

With arm 57 extended, operation of cylinder 56 acting through crank 61, 63 and power cylinder 55 imparts motion to yoke 48 to move the latter from its most inward position A for engaging a tool pair on the right pair of tool bearing shafts at the set-up location, to a retracted position B slightly to the right of engaging position A. At this retracted position B, yoke 48 will not engage any of the tools on the pair of shafts at the lower right of FIG. 1. In particular, yoke 48 will be in its engaging position A when extension 65 of cylinder 55 is retracted and yoke 48 will be in disengaging position B when extension 65 is fully projected. Yoke 48 is also operable to an indexing or more remote disengaging position C where it is clear of the path through which the elements on sub-frame 16, 17 move when sub-frame 16, 17 is indexed. This latter position is achieved by fully retracting arm 57 of cylinder 56 and fully extending arm 65 of cylinder 55.

It should now be apparent to those skilled in the art that as lead screw 42 rotates, carrier 44 moves along the length thereof. As this is occurring, preselected information fed to a computer that controls and coordinates operation of lead screw 42 with operation of power cylinders 55, 56 causes yoke 58 to move between its head engaging A and disengaging B positions when carrier 44 is in appropriate positions along the length of lead screw 42, to sequentially engage the head pairs on the right-hand tool carrying shafts at the set-up location to move these head pairs to selected positions. Similarly, power cylinders 75, 76 connected to yoke 47 for pivoting same about guide shaft 45 are operated so that yoke 47 sequentially engages the head pairs on the left set of tool bearing shafts at the set-up location. Movements of yokes 47, 48 between their respective engaging A and releasing B positions is independent of the position in which the other of the yokes 47, 48 is at any time. However, for normal operation the positions of yokes 47, 48 should be interlocked with indexing of sub-frame 16, 17 so that the latter cannot be indexed unless yokes 47, 48 are both in their most outward positions C.

In a manner well known to the art, indexing shaft 15 is moved longitudinally (parallel to the length thereof) to automatically adjust for weave of the paper web moving through the working location along path 20. This movement of shaft 15 and sub-frame 16, 17, as well as the two cutting creasing stations mounted to the latter, is monitored by sensor 74. However, lead screw 42 is fixed against longitudinal movement. In order to permit set-up to take place while a web is moving through the working region, signals generated by sensor 74 are fed to the computer electronics that controls the position of carrier 44 by controlling the operation of lead screw 42 so that at any instant the position of carrier 44 reflects the transverse location of sub-frame 16, 17 dictated by paper weave. The rotational velocity of lead screw 42 can also be controlled by the computer to compensate for the linear velocity of the sub-frame 16, 17.

The circuitry for controlling operation of lead screw 42 and power cylinder pairs 55, 56 has not been described herein since it is known to the art to which this invention pertains and does not constitute an inventive feature of the invention described herein.

Although the present invention has been described in connection with a preferred embodiment thereof, many variations and modifications will now become apparent to those skilled in the art. It is preferred, therefore, that the present invention be limited not by the specific disclosure herein, but only by the appended claims.

What is claimed is:

1. Slitter scorer apparatus including a first station and a second station; each of said stations including first, second, third and fourth parallel tool carrying shafts; a main relatively fixed frame; a sub-frame having said stations thereon; means defining a pivot axis disposed between said stations and about which said sub-frame is pivotable 180° between first and second positions relative to said fixed frame; with said sub-frame in said first position, said first station being at a working location and said second station being at a set-up location; with said sub-frame in said second position, said second station being at said working location and said first station being at said set-up location; a power driven common adjusting means for longitudinally positioning tools on said first, second, third and fourth parallel tool carrying shafts of both said first and second stations; said adjusting means disposed at said set-up location to move tools to selected axial positions along said shafts of the one of said stations at said set-up location while a web of sheet material is running along a path extending through the other of said stations; said set-up location and said adjusting means being entirely on one side of a plane in which said web moves through said stations; said adjusting means including adjusting elements selectively engageable in sequence with tools on said first, second, third and fourth shafts of the one of said stations disposed at said set-up location, with a first of said adjusting elements engaging in sequence cooperating tool sections on two of said shafts at said set-up location and a second of said adjusting elements engaging in sequence cooperating tool sections on two others of said shafts at said set-up location.

2. Slitter scorer apparatus as set forth in claim 1 in which the adjusting means also includes a carrier to which said first and second adjusting elements are operatively connected for transverse movement therewith; and power operated means movable with said carrier for selectively and independently operating said first and second adjusting elements relative to said carrier between a tool engaging position and a tool releasing position; said first adjusting element moving in a first direction when operated toward its said tool engaging position; said second adjusting element moving in a second direction, opposite to said first direction, when operated toward its said tool engaging position.

3. Slitter scorer apparatus as set forth in claim 2 in which the power operated means also selectively moves the adjusting elements to indexing positions wherein said adjusting elements are clear of the path through which the sub-frame and elements carried thereby move during indexing of the stations between the working and set-up locations; said adjusting elements when in said tool engaging and tool releasing positions being in said path.

4. Slitter scorer apparatus as set forth in claim 2 in which at least part of the carrier is below the sub-frame with one of the adjusting elements being disposed upstream of the station positioned at the set-up location and the other of the adjusting elements being disposed downstream of the station positioned at the set-up location.

5. Slitter scorer apparatus as set forth in claim 2 in which the adjusting means further includes a mechanical driving member for driving said carrier; said mechanical driving member having a longitudinal axis fixed against lateral movement.

6. Slitter scorer apparatus as set forth in claim 5 in which the mechanical driving member comprises a lead screw; first and second guide shafts parallel to said screw, one upstream of the latter and the other downstream of the latter; said guide shafts being connected to said carrier to guide movement thereof parallel to said screw; said first guide shaft providing a pivot axis for movement of the first adjusting element relative to the carrier; said second guide shaft providing a pivot axis for movement of the second adjusting element relative to the carrier.

7. Slitter scorer apparatus as set forth in claim 5 in which the set-up location is disposed entirely below said plane in which said web moves through said stations.

8. Slitter scorer apparatus as set forth in claim 5 in which said sub-frame is movable along said pivot axis to adjust for weaving of a web moving through said working location; said mechanical driving member also being fixed against movement along its longitudinal axis; and the instantaneous position of said carrier along said mechanical driving member being partially a function of the instantaneous position of said sub-frame along said pivot axis.

9. Slitter scorer apparatus as set forth in claim 1 in which the set-up location is disposed entirely below said plane in which said web moves through said station.

10. Slitter scorer apparatus as set forth in claim 1 in which each of said adjusting elements is movable between a tool engaging position and a tool releasing position; said first adjusting element in moving toward its said tool engaging position moving toward said second adjusting element and the latter in moving toward its said tool engaging position moving toward said first adjusting element.

11. Slitter scorer apparatus as set forth in claim 10 in which a vertical plane containing said pivot axis extends between said first and second adjusting elements; with either of said stations being at said working location; half of said tool carrying shafts being on one side of said vertical plane and the remaining ones of said tool carrying shafts being on the other side of said plane.

12. Slitter scorer apparatus as set forth in claim 11 in which the adjusting means also includes a carrier positioned below the one of said stations at said set-up location; said adjusting means also including a single elongated lead screw for driving said carrier; said lead screw having a horizontal transversely fixed longitudinal axis disposed within said vertical plane.

13. Slitter scorer apparatus including a first station and a second station; each of said stations including first, second, third and fourth parallel tool carrying shafts; a main relatively fixed frame; a sub-frame having said stations thereon; means defining a pivot axis disposed between said stations and about which said sub-frame is pivotable between first and second positions relative to said fixed frame; with said sub-frame in said first position, said first station being at a working location and said second station being at a set-up location; with said sub-frame in said second position, said second station being at said working location and said first station being at said set-up location to move tools to selected axial positions along said shafts of the one of said stations at said set-up location being entirely on one side of a plane in which said web moves through said stations; said adjusting means including adjusting elements selectively engageable in sequence with tools on said first, second, third and fourth shafts of the one of said stations disposed at said set-up location, with a first of said adjusting elements engaging in sequence cooperating tool sections on two of said shafts at said set-up location and a second of said adjusting elements engaging in sequence cooperating tool sections on two others of said shafts at said set-up location; said adjusting means also including a carrier to which said first and second adjusting elements are operatively connected for transverse movement therewith, power operated means movable with said carrier for selectively and independently operating said first and second adjusting elements relative to said carrier between a tool engaging position and a tool releasing position, and a mechanical driving member for driving said carrier; said mechanical driving member comprising a lead screw having its longitudinal axis fixed against lateral movement; first and second guide shafts parallel to said screw, one upstream of the latter and the other downstream of the latter; said guide shafts being connected to said carrier to guide movement thereof parallel to said screw; said first guide shaft providing a pivot axis for movement of the first adjusting element relative to the carrier; said second guide shaft providing a pivot axis for movement of the second adjusting element relative to the carrier.

14. Slitter scorer apparatus as set forth in claim 13 in which said sub-frame is movable along said pivot axis to adjust for weaving of a web moving through said working location; said lead screw also being fixed against movement along its longitudinal axis; and the instantaneous position of said carrier along said mechanical driving member being partially a function of the instantaneous position of said sub-frame along said pivot axis.

15. Slitter scorer apparatus as set forth in claim 13 in which at least part of the carrier is below the sub-frame with one of the adjusting elements being disposed upstream of the station positioned at the set-up location and the other of the adjusting elements being disposed downstream of the station positioned at the set-up location.

16. Slitter scorer apparatus as set forth in claim 15 in which the power operated means also selectively moves the adjusting elements to indexing positions wherein said adjusting elements are clear of the path through which the sub-frame and elements carried thereby move during indexing of the stations between the working and set-up locations; said adjusting elements when in said tool engaging and tool releasing positions being in said path.

17. Slitter scorer apparatus as set forth in claim 16 in which the set-up location is disposed entirely below said plane in which said web moves through said stations.

* * * * *